(12) United States Patent
Fuzell-Casey et al.

(10) Patent No.: US 11,899,713 B2
(45) Date of Patent: Feb. 13, 2024

(54) MUSIC STREAMING, PLAYLIST CREATION AND STREAMING ARCHITECTURE

(71) Applicant: APERTURE INVESTMENTS, LLC, Mercer Island, WA (US)

(72) Inventors: Jacquelyn Fuzell-Casey, Mercer Island, WA (US); Skyler Fuzell-Casey, Mercer Island, WA (US)

(73) Assignee: APERTURE INVESTMENTS, LLC, Mercer Island, WA (US)

( * ) Notice: Subject to any disclaimer, the term of this patent is extended or adjusted under 35 U.S.C. 154(b) by 0 days.

(21) Appl. No.: 18/150,728

(22) Filed: Jan. 5, 2023

(65) Prior Publication Data

US 2023/0185846 A1    Jun. 15, 2023

Related U.S. Application Data

(63) Continuation of application No. 17/721,214, filed on Apr. 14, 2022, now Pat. No. 11,609,948, which is a continuation of application No. 17/584,847, filed on Jan. 26, 2022, which is a continuation-in-part of application No. 16/837,796, filed on Apr. 1, 2020, (Continued)

(51) Int. Cl.
| | |
|---|---|
| G06F 16/638 | (2019.01) |
| G06F 16/65 | (2019.01) |
| G06F 21/62 | (2013.01) |
| G06F 16/958 | (2019.01) |
| G06F 16/683 | (2019.01) |

(52) U.S. Cl.
CPC ........... *G06F 16/639* (2019.01); *G06F 16/65* (2019.01); *G06F 16/683* (2019.01); *G06F 16/958* (2019.01); *G06F 21/6218* (2013.01)

(58) Field of Classification Search
None
See application file for complete search history.

(56) References Cited

U.S. PATENT DOCUMENTS 5,561,649 A    10/1996   Lee et al.
6,151,571 A    11/2000   Pertrushin
(Continued)

OTHER PUBLICATIONS www.picitup.com; Picitup's; PicColor product; copyright 2007-2010; accessed Feb. 2, 2015; 1 page.
(Continued)

*Primary Examiner* — Delomia L Gilliard
(74) *Attorney, Agent, or Firm* — BakerHostetler

(57) ABSTRACT

A system and method for making categorized music tracks available to end user applications. The tracks may be categorized based on computer-derived rhythm, texture and pitch (RTP) scores for tracks derived from high-level acoustic attributes, which is based on low level data extracted from the tracks. RTP scores are stored in a universal database common to all of the music publishers so that the same track, once RTP scored, does not need to be re-RTP scored by other music publishers. End user applications access an API server to import collections of tracks published by publishers, to create playlists and initiate music streaming. Each end user application is sponsored by a single music publisher so that only tracks capable of being streamed by the music publisher are available to the sponsored end user application.

20 Claims, 11 Drawing Sheets

Related U.S. Application Data now Pat. No. 11,271,993, which is a continuation-in-part of application No. 16/292,193, filed on Mar. 4, 2019, now Pat. No. 10,623,480, which is a continuation-in-part of application No. 15/868,902, filed on Jan. 11, 2018, now Pat. No. 10,225,328, which is a continuation-in-part of application No. 14/671,979, filed on Mar. 27, 2015, now Pat. No. 10,242,097, and a continuation-in-part of application No. 14/671,973, filed on Mar. 27, 2015, now Pat. No. 9,875,304, which is a continuation-in-part of application No. 14/603,324, filed on Jan. 22, 2015, now Pat. No. 10,061,476, and a continuation-in-part of application No. 14/603,325, filed on Jan. 22, 2015, now abandoned.

(60) Provisional application No. 61/971,490, filed on Mar. 27, 2014.

(56) References Cited

U.S. PATENT DOCUMENTS

| | | | |
|---|---|---|---|
| 6,411,289 | B1 | 6/2002 | Zimmerman |
| 6,464,585 | B1 | 10/2002 | Miyamoto et al. |
| 6,539,395 | B1 | 3/2003 | Gjerdingen et al. |
| 6,657,117 | B2 | 12/2003 | Weare et al. |
| 6,748,395 | B1 | 6/2004 | Picker et al. |
| 6,964,023 | B2 | 11/2005 | Maes et al. |
| 6,993,532 | B1 | 1/2006 | Platt et al. |
| 7,003,515 | B1 | 2/2006 | Glaser et al. |
| 7,022,907 | B2 | 4/2006 | Lu et al. |
| 7,024,424 | B1 | 4/2006 | Platt et al. |
| 7,080,324 | B1 | 7/2006 | Nelson et al. |
| 7,115,808 | B2 | 10/2006 | Lu et al. |
| 7,205,471 | B2 | 4/2007 | Looney et al. |
| 7,206,775 | B2 | 4/2007 | Kaiser et al. |
| 7,227,074 | B2 | 6/2007 | Ball |
| 7,233,684 | B2 | 6/2007 | Fedorovskaya et al. |
| 7,296,031 | B1 | 11/2007 | Platt et al. |
| 7,396,990 | B2 | 7/2008 | Lu et al. |
| 7,424,447 | B2 | 9/2008 | Fuzell-Casey et al. |
| 7,427,708 | B2 | 9/2008 | Ohmura |
| 7,485,796 | B2 | 2/2009 | Myeong et al. |
| 7,541,535 | B2 | 6/2009 | Bal |
| 7,562,032 | B2 | 7/2009 | Abbosh et al. |
| 7,582,823 | B2 | 9/2009 | Kim et al. |
| 7,626,111 | B2 | 12/2009 | Kim et al. |
| 7,756,874 | B2 | 7/2010 | Hoekman et al. |
| 7,765,491 | B1 | 7/2010 | Cotterill |
| 7,786,369 | B2 | 8/2010 | Eom et al. |
| 7,809,793 | B2 | 10/2010 | Kimura et al. |
| 7,822,497 | B2 | 10/2010 | Wang |
| 7,858,868 | B2 | 12/2010 | Kemp et al. |
| 7,921,067 | B2 | 4/2011 | Kemp et al. |
| 8,013,230 | B2 | 9/2011 | Eggink |
| 8,229,935 | B2 | 7/2012 | Lee et al. |
| 8,248,436 | B2 | 8/2012 | Kemp et al. |
| 8,260,778 | B2 | 9/2012 | Ghatak |
| 8,269,093 | B2 | 9/2012 | Naik et al. |
| 8,346,801 | B2 | 1/2013 | Hagg et al. |
| 8,354,579 | B2 | 1/2013 | Park et al. |
| 8,390,439 | B2 | 3/2013 | Cruz-Hernandez et al. |
| 8,407,224 | B2 | 3/2013 | Bach et al. |
| 8,410,347 | B2 | 4/2013 | Kim et al. |
| 8,505,056 | B2 | 8/2013 | Cannistraro et al. |
| 8,686,270 | B2 | 4/2014 | Eggink et al. |
| 8,688,699 | B2 | 4/2014 | Eggink et al. |
| 8,855,798 | B2 | 10/2014 | Dimaria et al. |
| 8,965,766 | B1 | 2/2015 | Weinstein et al. |
| 9,165,255 | B1 | 10/2015 | Shetty et al. |
| 9,195,649 | B2 | 11/2015 | Neuhasuer et al. |
| 9,788,777 | B1 | 10/2017 | Knight et al. |
| 9,830,896 | B2 | 11/2017 | Wang et al. |
| 9,842,146 | B2 | 12/2017 | Chen et al. |

| | | | |
|---|---|---|---|
| 2002/0181711 | A1* | 12/2002 | Logan ............... H04S 1/007 381/1 |
| 2003/0045953 | A1 | 3/2003 | Weare et al. |
| 2003/0133700 | A1 | 7/2003 | Uehara et al. |
| 2003/0221541 | A1 | 12/2003 | Platt et al. |
| 2005/0065781 | A1 | 3/2005 | Tell et al. |
| 2005/0109194 | A1 | 5/2005 | Gayama et al. |
| 2005/0109195 | A1 | 5/2005 | Haruyama et al. |
| 2005/0211071 | A1 | 9/2005 | Lu et al. |
| 2005/0234366 | A1 | 10/2005 | Heinz et al. |
| 2005/0241465 | A1 | 11/2005 | Goto et al. |
| 2005/0252362 | A1 | 11/2005 | McHale |
| 2006/0047649 | A1 | 3/2006 | Liang et al. |
| 2006/0096447 | A1 | 5/2006 | Weare et al. |
| 2006/0143647 | A1 | 6/2006 | Bill et al. |
| 2006/0170945 | A1* | 8/2006 | Bill ............... H04L 51/04 358/1.13 |
| 2007/0079692 | A1 | 4/2007 | Glatt et al. |
| 2007/0107584 | A1 | 5/2007 | Kim et al. |
| 2007/0113725 | A1 | 5/2007 | Oliver et al. |
| 2007/0113726 | A1 | 5/2007 | Oliver et al. |
| 2007/0131096 | A1 | 6/2007 | Lu et al. |
| 2008/0021851 | A1 | 1/2008 | Alcalde et al. |
| 2008/0040362 | A1 | 2/2008 | Aucouturier et al. |
| 2008/0184167 | A1 | 7/2008 | Berrill et al. |
| 2008/0189754 | A1 | 8/2008 | Yoon et al. |
| 2008/0235284 | A1 | 9/2008 | Aarts et al. |
| 2008/0253695 | A1 | 10/2008 | Sano et al. |
| 2008/0300702 | A1 | 12/2008 | Gomez et al. |
| 2008/0314228 | A1 | 12/2008 | Dreyfuss et al. |
| 2009/0063414 | A1* | 3/2009 | White ............... G06F 16/40 |
| 2009/0069914 | A1 | 3/2009 | Kemp et al. |
| 2009/0071316 | A1 | 3/2009 | Oppenheimer et al. |
| 2009/0182736 | A1 | 7/2009 | Ghatak et al. |
| 2009/0234888 | A1 | 9/2009 | Holmes et al. |
| 2010/0011388 | A1 | 1/2010 | Bull et al. |
| 2010/0042932 | A1 | 2/2010 | Lehtiniemi et al. |
| 2010/0053168 | A1 | 3/2010 | Kemp et al. |
| 2010/0082627 | A1 | 4/2010 | Lai et al. |
| 2010/0086204 | A1 | 4/2010 | Lessing et al. |
| 2010/0091138 | A1 | 4/2010 | Nair et al. |
| 2010/0094441 | A1 | 4/2010 | Mochizuki et al. |
| 2010/0223128 | A1 | 9/2010 | Dukellis et al. |
| 2010/0223223 | A1 | 9/2010 | Sandler et al. |
| 2010/0253764 | A1 | 10/2010 | Sim et al. |
| 2010/0260363 | A1 | 10/2010 | Glatt et al. |
| 2010/0325135 | A1 | 12/2010 | Chen et al. |
| 2011/0112671 | A1 | 5/2011 | Weinstein et al. |
| 2011/0184539 | A1 | 7/2011 | Agevik et al. |
| 2011/0191674 | A1 | 8/2011 | Rawley et al. |
| 2011/0202567 | A1 | 8/2011 | Bach et al. |
| 2011/0239137 | A1 | 9/2011 | Bill et al. |
| 2011/0242128 | A1 | 10/2011 | Kang et al. |
| 2011/0252947 | A1 | 10/2011 | Eggink et al. |
| 2011/0252951 | A1 | 10/2011 | Leavitt et al. |
| 2011/0271187 | A1 | 11/2011 | Sullivan et al. |
| 2011/0289075 | A1 | 11/2011 | Nelson et al. |
| 2011/0314039 | A1 | 12/2011 | Zheleva et al. |
| 2012/0090446 | A1 | 4/2012 | Moreno et al. |
| 2012/0125177 | A1* | 5/2012 | Alcalde ............... G06F 16/637 84/608 |
| 2012/0132057 | A1 | 5/2012 | Kristensen et al. |
| 2012/0172059 | A1 | 7/2012 | Kim et al. |
| 2012/0179693 | A1 | 7/2012 | Knight et al. |
| 2012/0179757 | A1 | 7/2012 | Jones et al. |
| 2012/0197897 | A1 | 8/2012 | Knight et al. |
| 2012/0226706 | A1 | 9/2012 | Choi et al. |
| 2012/0260789 | A1 | 10/2012 | Ur et al. |
| 2012/0272185 | A1 | 10/2012 | Dodson et al. |
| 2012/0296908 | A1 | 11/2012 | Bach et al. |
| 2013/0032023 | A1 | 2/2013 | Pulley et al. |
| 2013/0086519 | A1 | 4/2013 | Fino et al. |
| 2013/0138684 | A1 | 5/2013 | Kim et al. |
| 2013/0167029 | A1 | 6/2013 | Friesen et al. |
| 2013/0173526 | A1 | 7/2013 | Wong et al. |
| 2013/0178962 | A1 | 7/2013 | DiMaria et al. |
| 2013/0204878 | A1 | 8/2013 | Kim et al. |
| 2013/0205223 | A1 | 8/2013 | Gilbert et al. |
| 2013/0247078 | A1 | 9/2013 | Nikankin et al. |

(56) References Cited

U.S. PATENT DOCUMENTS

| | | |
|---|---|---|
| 2014/0052731 A1 | 2/2014 | Dahule et al. |
| 2014/0053710 A1 | 2/2014 | Serletic, II |
| 2014/0053711 A1 | 2/2014 | Serletic, II |
| 2014/0059430 A1* | 2/2014 | White ................... G06F 16/639 |
| | | 715/716 |
| 2014/0080606 A1 | 3/2014 | Gillet et al. |
| 2014/0085181 A1 | 3/2014 | Roseway et al. |
| 2014/0094156 A1 | 4/2014 | Uusitalo et al. |
| 2014/0140536 A1 | 5/2014 | Serletic, II |
| 2014/0180673 A1 | 6/2014 | Neuhauser et al. |
| 2014/0282237 A1 | 9/2014 | Fuzell-Casey et al. |
| 2014/0310011 A1 | 10/2014 | Biswas et al. |
| 2014/0372080 A1 | 12/2014 | Chu |
| 2015/0078583 A1 | 3/2015 | Ball et al. |
| 2015/0081064 A1 | 3/2015 | Ball et al. |
| 2015/0081065 A1 | 3/2015 | Ball et al. |
| 2015/0081613 A1 | 3/2015 | Ball et al. |
| 2015/0134654 A1 | 5/2015 | Fuzell-Casey |
| 2015/0179156 A1 | 6/2015 | Uemura et al. |
| 2015/0205864 A1 | 7/2015 | Fuzell-Casey et al. |
| 2015/0220633 A1 | 8/2015 | Fuzell-Casey et al. |
| 2015/0269307 A1 | 9/2015 | Pal et al. |
| 2016/0110884 A1 | 4/2016 | Fuzell-Casey et al. |
| 2016/0125863 A1 | 5/2016 | Henderson |
| 2016/0139241 A1 | 5/2016 | Holz et al. |
| 2016/0188981 A1 | 6/2016 | Doerring et al. |
| 2016/0203805 A1 | 7/2016 | Strachan |
| 2016/0267637 A1 | 9/2016 | Hsiao et al. |
| 2016/0329043 A1 | 11/2016 | Kim et al. |
| 2016/0337426 A1 | 11/2016 | Shribman et al. |
| 2016/0372096 A1 | 12/2016 | Lyske |
| 2017/0091983 A1 | 3/2017 | Sebastian et al. |
| 2017/0103740 A1 | 4/2017 | Hwang et al. |
| 2017/0206875 A1 | 7/2017 | Hwang et al. |
| 2017/0330540 A1 | 11/2017 | Quattro et al. |
| 2017/0364589 A1* | 12/2017 | Roswell ................ G06F 16/683 |
| 2018/0033416 A1 | 2/2018 | Neuhasuer et al. |
| 2018/0047372 A1 | 2/2018 | Scallie et al. |
| 2018/0049688 A1 | 2/2018 | Knight et al. |
| 2018/0053261 A1 | 2/2018 | Hershey |
| 2018/0139268 A1 | 5/2018 | Fuzell-Casey et al. |
| 2019/0238952 A1 | 8/2019 | Boskovich |

OTHER PUBLICATIONS http://labs.tineye.com; Multicolor; Idee Inc.; copyright 2015; accessed Feb. 2, 2015, 1 page.

http://statisticbrain.com/attention-span-statistics/; Statistics Brain; Statistic Brain Research Institute; accessed Feb. 2, 2015; 4 pages.

Dukette et al.; "The Essential 20: Twenty Components of an Excellent Health Care Team"; RoseDog Books; 2009; p. 72-73.

Music Genome Project; http://en.wikipedia.org/wiki/Music.sub.--Genome.sub.--Project; accessed Apr. 15, 2015; 4 pages.

Ke et al.; "Computer Vision for Music Identification"; In Proceedings of Computer Vision and Pattern Recognition; 2005; vol. 1; p. 597-604.

Lalinsky; "How does Chromaprint work?"; https://oxygene.sk/2011/01/how-does-chromaprint-work; Jan. 18, 2011; accessed Apr. 15, 2015; 3 pages.

Gforce; http://www.soundspectrum.com; copyright 2015; accessed Apr. 15, 2015; 2 pages.

Harlan J. Brothers; "Intervallic Scaling in the Bach Cello Suites"; Fractals; vol. 17 Issue 4; Dec. 2009; p. 537-545.

Ke et al.; "Computer Vision for Music Identification"; IEEE Computer Vision and Pattern Recognition CVPR; Jun. 2005; 8 pages.

* cited by examiner

MUSIC STREAMING, PLAYLIST CREATION AND STREAMING ARCHITECTURE

CROSS-REFERENCE TO RELATED APPLICATIONS

This application is a continuation of U.S. patent application Ser. No. 17/721,214, filed Apr. 14, 2022; which is a continuation of U.S. patent application Ser. No. 17/584,847, filed Jan. 26, 2022; which is a continuation-in-part of U.S. patent application Ser. No. 16/837,796, filed Apr. 11, 2020, now U.S. Pat. No. 11,271,993, issued Mar. 8, 2022; which is a continuation-in-part of U.S. patent application Ser. No. 16/292,193, filed Mar. 4, 2019, now U.S. Pat. No. 10,623,480, issued Apr. 14, 2020; which is a continuation-in-part of U.S. patent application Ser. No. 15/868,902, filed Jan. 11, 2018, now U.S. Pat. No. 10,225,328, issued Mar. 5, 2019; which is a continuation-in-part of U.S. patent application Ser. No. 14/671,973, filed Mar. 27, 2015, now U.S. Pat. No. 9,875,304, issued Jan. 23, 2018; which is a continuation-in-part of U.S. patent application Ser. No. 14/603,324, filed Jan. 22, 2015, now U.S. Pat. No. 10,061,476, issued Aug. 28, 2018, and is a continuation-in-part of U.S. patent application Ser. No. 14/603,325, filed Jan. 22, 2015; which claims benefit under 35 U.S.C. § 119(e) of Provisional Application No. 61/971,490, filed Mar. 27, 2014; the entire contents of each of which are incorporated herein by reference.

U.S. patent application Ser. No. 15/868,902 is also a continuation-in-part of U.S. patent application Ser. No. 14/671,979, filed Mar. 27, 2015, now U.S. Pat. No. 10,242,097, issued Mar. 26, 2019, the entire contents of which are incorporated herein by reference.

TECHNICAL FIELD

The present disclosure relates to music streaming services.

BACKGROUND

Many music streaming services, such as APPLE MUSIC, AMAZON MUSIC, PANDORA, SIRIUSXM, SPOTIFY, TIDAL, and YOUTUBE, provide a range of features that allow users to listen to curated playlists, or create and save their own, based on the catalog of music tracks that have been licensed to or are owned by the streaming service. Typically, only one playlist can be selected at one time to be played. Such services also typically seek to develop catalogs of millions of tracks so there is something for every taste. At the same time, many other music publishing entities, such as radio stations, gaming companies, independent record labels, entertainment companies, have catalogs of music tracks available that may or may not be available to the streaming service, either because the entity does not have the right to make them available, is concerned that licensing the music tracks will not generate enough income from the streaming service, or the entity wants the end users to know the entity provided the music tracks but has no practical way of doing so through the streaming service.

If a music publisher wants to stream music to users, the music publisher needs to obtain a streaming service and make some type of third party application available to the user. Typically, the third party application is browser-based so that it can used on many different devices, such as desktops, laptops and other mobile devices. Such applications, however, are built around a traditional broadcasting model where revenue is either generated from the application based on programmatic streaming with inserted advertising or subscription services.

SUMMARY

A system and method for music publishers to provide non-programmatic streamed music to end users that enables end users to create personalized playlists. The playlists may be based on computer-derived rhythm, texture and pitch (RTP) scores for predetermined tracks. The RTP scores may be derived from high-level acoustic attributes for tracks determined by an analyzed extraction of low-level data from the tracks. The RTP scores may be used to determine a category for each track among the plurality of categories and playlists of the tracks may be based on the categories and other factors.

The RTP scores may be classified by a plurality of music publishers and stored in a universal database common to all of the music publishers. The universal database may include collections of tracks assembled by each of the music publishers. Each track may have an RTP score, a category that corresponds to the RTP score, and metadata associated with the track, but does not include the audio file. A universal end user application accesses an API server to import collections, create and save playlists, and initiate the streaming of music from a streaming server to the end user application. Each universal end user application is sponsored by a single music publisher so that only tracks capable of being streamed by the music publisher are available to the sponsored end user application and so that the music publisher can contribute collections to and to customize the sponsored end user application in a manner unique to that music publisher.

BRIEF DESCRIPTION OF THE DRAWINGS

Throughout the drawings, reference numbers may be re-used to indicate correspondence between referenced elements. The drawings are provided to illustrate examples described herein and are not intended to limit the scope of the disclosure.

DETAILED DESCRIPTION OF ILLUSTRATIVE EMBODIMENTS

Figure 1:
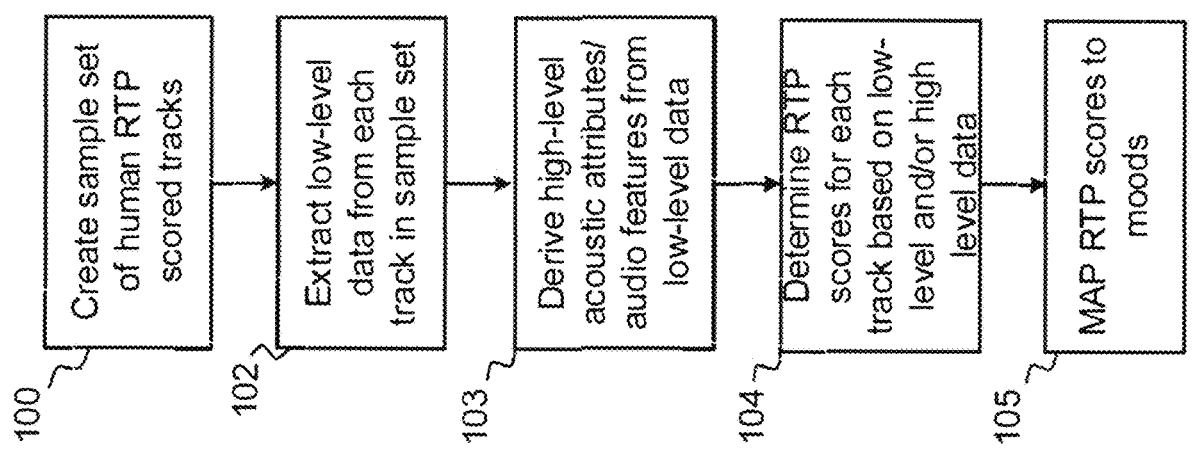
FIG. 1 is an embodiment of a flow chart illustrating how tracks are sampled, low-level data is extracted and RTP scores are determined and mapped to moods, optionally with intensity levels.

Embodiments of the present disclosure are primarily directed to music categorization, playlist creation and music streaming to an end user application. In particular, embodiments involve a music categorization system that objectively categories music based on rhythm, texture and pitch (RTP) values or scores, from which the mood or some other category of the music may be determined and used to create playlists, which may then be streamed to end users through an end user application that can be customized by the music publisher.

With respect to mood, when someone listens to a track, the track tends to evoke some emotion. This may be because of some personal connection a user has to the track, such as memories or experiences related to the track, but may also be because of the track's inherent qualities. Since those inherent qualities may be represented by frequency-related data (i.e., frequencies, structure and organization), that frequency-related data may be used to identify those inherent qualities. The present disclosure describes how spectrograms, whether based on chromagrams or using other forms of spectrograms, and other data may be used to objectively determine the inherent qualities of RTP, which may then be subjectively or objectively mapped to moods to identify tracks in a new manner.

Values for RTP may be determined holistically, based on low-level data extracted from the music, or high-level data constructed or derived from the low-level data. For example, a holistic method for determining RTP may be as follows. All music can be identified by its frequency-related data, such as an audio spectrogram. Audio spectrograms may be based on a short-term Fourier transform developed to provide a more complete and precise extracted representation of a track. The spectrogram may be a two-dimensional (2-D) representation of the intensity of frequency over time, like a waveform, but provide a more accurate extracted representation of the track because the spectrogram shows changes in intensity at specific frequencies, much like a musical score. The 2-D spectrogram may show more visual distinctions than a 1-D waveform based on signal differences due to different audio sources, such as different voices and different types of instruments being played, etc.

A solution for analyzing spectrograms extracted from audio files may involve converting each audio file into mel-spectrograms, representing multiple audio features extracted from each predetermined period (such as one second) of each audio file, that are then input to a trained neural network. This neural network may be trained based on an ontology of audio event classes and a large-scale collection of human-labeled sound clips. In an embodiment, desired layers from this pre-trained network may then be extracted to generate a vector of audio features for each predetermined period. In an embodiment, the vector may include a plurality of features for each one second of input audio.

While the audio representations, chromagrams or melspectrograms may be robust, they do not lend themselves well to visual comparative analysis and need to be further compacted to be useful in that regard. There are a number of ways in which chromagrams may be compacted through filtering. For example, a chromagram image may be scanned from left to right, one pixel at a time, in grayscale, to create a large number of subimages. Then, characteristic filters may be applied to the subimages to capture intensity differences over time in the musical notes represented by the subimages. Each filter may calculate the sum of specific areas of the subimages, compare the sums, and arrange the areas in a number of ways.

The arrangement of filter images may be placed over the subimages, adjusted in size (as long as the filter images fit within the pixel size of the subimage), and the resulting black and white areas may be processed to derive a single real number representing the arrangement. Every characteristic filter may have one or more coefficients associated with it that specify the rules for quantizing the real number so the final result is an integer.

Filtering and comparative analysis is not required in all embodiments. Once an audio classification, either through the neural network analysis or audio fingerprint analysis, has been determined for a track having known RTP scores determined through other means (such as a human listener, a spectrum analyzer, or other electrical measurement tool), that audio classification may be compared to other audio classifications having unknown RTP scores to see if matches can be found. Matches may include any corresponding tracks having the same or very similar RTP scores. If there are no matches, then further comparisons may need to be run until the unknown RTP scores in the audio classification have been identified. Although this holistic approach might involve a human listening to the music to determine known RTP scores corresponding to a sufficient number of tracks for comparative purposes, the approach is still much more efficient than the existing technique of relying on humans to listen to every track.

In an embodiment based on the audio classifications, as illustrated in FIG. 1, tracks sufficient to create a sample set may be listened to by humans to develop RTP scores that correspond to each track (step 100). Those tracks may then be sampled, step 102, by a neural net trained music data extractor, such as any of those described herein. The low-level extracted data may include acoustic descriptors characterizing loudness, dynamic complexity, spectral shapes, barkbands, melbands, Equivalent Rectangular Bandwidth (ERB) bands, etc., rhythm descriptors characterizing beats per minute (BPM), BPM histograms, onset rates, etc., and tonal descriptors characterizing keys, chords, scales, etc. The low-level data may then be analyzed, step 103, to derive high-level acoustic attributes or audio features based on the low-level data and/or high-level data, and may be further analyzed, step 104, by a neural network to determine and classify other high-level data, such as rhythm, texture and pitch. The RTP data may be represented in different forms. In an embodiment, the RTP scores are represented on a half-point scale ranging from 1 to 5.

In an embodiment, a greedy algorithm may analyze all of the low-level data extracted from each track in the sample set and all of the high-level data extracted therefrom to determine which low-level data and high-level data contributes to correct solutions for RTP scores of each track, based on the known RTP scores. The greedy algorithm may operate by sorting through the low-level data and high-level data to select the best data candidates for solving for correct RTP scores for each track. Each best candidate may then be analyzed to determine if the candidate can be used to contribute to the solution. If the candidate can contribute to the solution, a value is assigned to each contributing candidate based on whether it fully or partially solves the solution. If there is no candidate that provides a full solution (as is almost always the case), a collection of contributing candidates is identified that either provides a complete solution or gets closest to the complete solution.

In an embodiment, the following low-level data may form a collection of contribution candidates for a solution for rhythm (R):
1. Beats per minute histogram and highest peak, spread of the first peak, first peak weight, and first peak beats per minute.
2. Energy (magnitude) in a frequency band.
3. Energy in one or more ERB bands of the spectrum and values of crest (ratio between the maximum value and the arithmetic mean) and flatness (ratio between the geometric mean and the arithmetic mean converted to db scale).
4. Weighted mean of frequencies as a measure of the spectral centroid, where the magnitude of the frequencies are the weights.
5. Skewness of the $0^{th}$, $1^{st}$, $2^{nd}$, $3^{rd}$ and $4^{th}$ central moments.
6. Minimum zero-crossing rate.
7. Mel-frequency cepstrum coefficients (MFCCs).
8. High frequency content.
9. Estimation of silence in a frame.

In an embodiment, the following low-level data may form a collection of contribution candidates for a solution for texture (T):
1. Shannon entropy (quantification of diversity).
2. Beats per minute histogram and mean of first peak spread and second beak beats per minute.
3. Energy in one or more Bark bands of the spectrum and values of crest (ratio between the maximum value and the arithmetic mean) and flatness (ratio between the geometric mean and the arithmetic mean converted to db scale).
4. MFCCs.
5. Spectral kurtosis and energy.
6. Beat energy within the whole spectrum.

In an embodiment, the following low-level data may form a collection of contribution candidates for a solution for pitch (Pt):
1. Weighted mean of frequencies as a measure of the spectral centroid, where the magnitude of the frequencies are the weights.
2. Shannon entropy (quantification of diversity).
3. Beats per minute histogram and first peak weight.
4. High frequency content.
5. Energy in ERB bands of the spectrum and values of flatness.
6. Spectral energy.

Different low-level data extractors may extract different data from the spectrograms than that indicated above. In such a case, the greedy algorithm may identify different low-level data that forms the collection of candidates for a solution to either R. T or P. High-level data extracted from the low-level data may be identified in a similar manner as described herein.

In an embodiment, rather than use a greedy algorithm, the extracted low-level data for each track may be converted to MFCCs (Mel-frequency cepstral coefficients) as an encoding step and then input into an artificial neural network. The layers of the neural network may extract data from the MFCCs for each track and combine that MFCC data with other data to identify an RTP score for each track, wherein the identification is based on the neural net being trained with known associations between MFCCs and RTP scores. The other data may include audio data augmentation, which may overcome problems associated with data scarcity and otherwise improve recognition performance. Audio data augmentation involves the creation of new synthetic training samples based on small perturbations in a training sample set to fill in gaps in the training data. A sufficiently large set of tracks with known RTP scores and other data, such as the audio data augmentation, may lead to a neural network sufficiently trained to determine unknown RTP scores for tracks with reasonably sufficient accuracy.

As noted above, RTP scores in an embodiment may range from 1 to 5 on a half point scale, i.e., 1.0, 1.5, 2.0, 2.5, 3.0, 3.5, 4.0, 4.5 and 5.0. As such the RTP scores may constitute a spectrum of scores ranging from (1.0, 1.0, 1.0) to (5.0, 5.0, 5.0). These RTP scores may be grouped in various ways. In an embodiment, such as step 105 of FIG. 1, the RTP scores may be grouped based on a small number of categories, such as the six moods of happy, excited, manic, peaceful, sad and cautious, or eight moods where cautious may be further separated into cautious/excited, cautious/peaceful and cautious/sad. In the above noted moods, sad may represent RTP scores with lower values and manic may represent RTP scores with higher values. For example, RTP (1.0, 1.0, 1.0) may correspond to sad and RTP (5.0, 5.0, 5.0) may correspond to manic, while RTP (3.0, 3.0, 3.0) may correspond to one of cautious/excited, cautious/peaceful and cautious/sad.

The moods identified above are just examples of categories into which similar RTP scored tracks may be organized. There could be many more categories. The categories may have any name or number associated with each one, such as the moods above, colors, locations, etc., including completely arbitrary or made-up words. Nevertheless, since it has been found that tracks with RTP scores such as (1.0, 2.0, 1.0) and (1.0, 1.0, 2.0) and (2.0, 2.0, 2.0) are similarly sounding, it makes logical sense to map those tracks to the same category.

Once the RTP scores have been grouped or mapped as desired, the RTP scores within a group may be further refined. For example, when RTP scores are mapped to moods, the RTP scores corresponding to a mood may fall along a spectrum of intensities. For example, RTP (1.0, 1.0, 1.0) may be the lowest intensity for sad, while RTP (3.0, 5.0, 2.0) may be the highest intensity for sad, with all other RTP scores corresponding to sad falling somewhere in between the lowest and highest RTP scores. Hence, the intensity levels for RTP scores within each mood may be determined based on a spectrum or distance factor from a centroid of 3-dimensional space. Although other methods of measuring intensity may be utilized, the above example may be used to group tracks corresponding to a mood as low, medium and high intensity (or any other suitable gradation) with respect to that mood, as will be further described below.

The description provided above for determining RTP scores for tracks may be based on averaging, where various averages are used to determine the RTP scores. For example, the entire track may not be sampled to extract the low-level data. Rather, samples may be collected at different times during a track, such as 10 second samples every 10 seconds, or different length samples at fixed or random points during the track. For a track with a consistent rhythm, texture and pitch throughout the entire track, such as Pachelbel's *Canon*, written somewhere between 1680 and 1706, and considered the godfather of pop music because so much pop music is based on a similar repetition, this form of averaging may be sufficient to generate a singular RTP score that corresponds to the track.

Other tracks may vary significantly throughout, such as starting softly and building up over time until there is a thunderous ending. Other tracks are literally all over the place and may have many different moods each with different intensity levels throughout. *Bohemian Rhapsody* by Queen, for example, is six minutes long and includes several sections, including an introduction, a ballad segment, an operatic passage, a hard rock part, and a reflective coda. For a track like Bohemian Rhapsody, samples taken during the introduction, the ballad segment, the operatic passage, the hard rock part and the coda may result in completely different RTP scores. In an embodiment, samples may be taken during the entire track or for sufficient lengths of time along a large enough set of points during each track, such that different RTP scores may be determined for different parts of the same track. For example, a track may be 40% manic, 40% sad, and 20% happy, and may have different intensity levels within each of those corresponding moods. A track with multiple moods may be referred to as a multi-mood track. In order to simplify the current disclosure, only RTP score, and therefore mood, is determined for each track, but it should be understood that multi-mood may be determined for each track as well.

Figure 2:
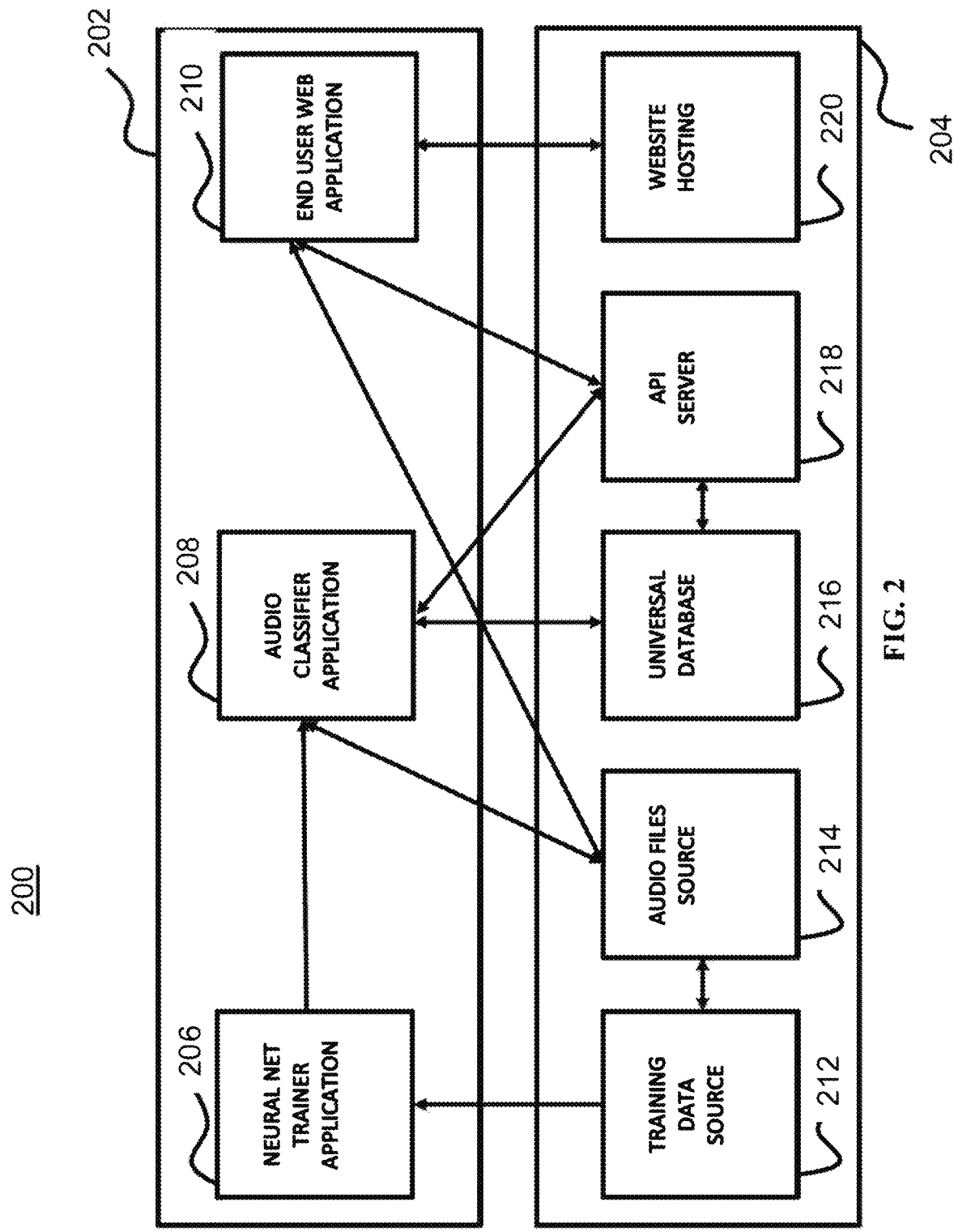
FIG. 2 is an embodiment of an illustration of the various elements of an exemplary system and the interaction between front end and back end elements.

FIG. 2 is an illustration of an embodiment of an exemplary overall system 200 architecture showing the various elements of the system and the interaction that may occur between the front end 202 of the system 200 and the back end 204 of the system 200. The front end 202 may comprise a neural net trainer application 206, an audio classifier application 208 and an end user web application 210. The back end 204 may comprise a training data source 212, an audio file source 214, a universal database 216, an API server 218, and a website hosting system 220.

As described above, the neural net trainer application 206, which may be operated by a licensor that licenses music publishers to use the audio classifier application 208 and provides training data from the training data source 212. The training data source 212 may include a database of music tracks and RTP scores that correspond to each track that serve as a sample set for training the neural net. The RTP scores may be human derived or objectively derived as described herein. In an embodiment, the audio classifier application 208 may access neural network algorithms on the neural net trainer application 206 in order to analyze tracks from audio files source 214 having unknown RTP scores in order to RTP classify each track. In an embodiment, the neural network algorithms used for both the low level data extraction and RTP classification may be packaged and built into the audio classifier application 208 so that RTP classification can be performed within the music classifier application 208 and without requiring interconnection to the neural net trainer application 206 for that purpose. As further illustrated in FIG. 3 below, the audio classifier application 208 may still be connected to the neural net trainer application 206 so that the neural net trainer application may control licenses issued to music publishers for use of the audio classifier application 208.

The audio classifier application 208 may be operated by a licensed music publisher, which has access to the audio files source 214 and a streaming service. The audio files source 214 may be comprised of digital tracks of music in MP3, MP4, FLAC and other formats, as well as metadata associated with each track, such as the title of each track, artist name, year of publication, genre, image art, etc. The audio files may be organized into collections of tracks that the music publisher may make available to end users. To create a collection of tracks, the music publisher may select a user interface element within the audio classifier application 208 that provides the music publisher with software tools necessary to make a new collection. The music publisher may then select tracks from audio files source 214 that are to be included in the collection. Collections may also be created from existing playlists, imported based on spreadsheets of data developed off line, or in other ways.

So that physical copies of each track, i.e., the digital format file, do not need to be stored in a collection, a link associated with the location of each track in audio files source 214 may be used in the collection. This enables the music publisher to include the same track in multiple different collections without having to create duplicate copies of such tracks. Once a collection had been assembled, the music publisher may input a title for the collection and select a save button. Ideally, the title of each collection may be unique so that music publishers and end users can distinguish between them. The music publisher may also input additional information about the collection, such as a short description of what the collection includes and save that information with the collection, which would be stored in the universal database 216. The audio classifier application 208 may enable the music publisher to view and edit the content of collections, such as adding and removing track links from the collection, as well as editing the collection title and other information associated with the collection.

Once a new or edited collection has been saved, the music publisher may use the neural net algorithms available to the audio classifier application 208 to analyze each track in the collection and determine each track's RTP score, which may then be stored in the universal database 216. Alternatively, the music publisher may determine the RTP score for each track in a music publisher database prior to creating any collections. The universal database 216 is referred to as being "universal" because it may not be unique to any music publisher. All music publishers may share the same universal database 216.

There may be an advantage of a universal database 216. The neural net algorithms may require up to a minute or two per track to determine the RTP score for each track, depending on processing power, bandwidth, etc. Additional time may be required to upload tracks to a streaming server. If hundreds or thousands of tracks are being RTP scored, this may take a considerable period. However, if a track had been previously RTP scored by a different music publisher, it may not be necessary to analyze that track again. For example, if the music publishers included a plurality of different radio stations, a number of stations may share a significant number of tracks in their collections. Those tracks may be identifiable by title, artist and year of first publication and that information may be sufficient to enable the audio classifier application to identify tracks in the universal database 216 that have already been RTP scored. In such a case, rather than take the time to RTP score existing tracks again, the audio classifier application 208 may just receive the existing RTP scores from the universal database 216 for each of those tracks. Universally tracking RTP scores may be different from universally storing uploaded tracks. For copyright reasons, only the licensed music publisher to a track may be allowed to upload that track to a streaming server. If a different music publisher also has rights to the same track, that music publisher may have to upload the track themselves, even though the RTP score may already be available.

With reference to FIG. 1, FIG. 3A, FIG. 3B, FIG. 3C and FIG. 3D, the end user web application 210 may be a browser-based application with a number of different screens enabling different graphical user interface capabilities. The end user web application may be capable of operating on any device with a web browser and a connection to the Internet. The end user web application 210 may be hosted on a website hosting system 220 and may enable end users authorized by a music publisher to create personalized playlists from collections stored in the universal database 216 in association with that music publisher. Rather than have direct access to the universal database 216, the end user web application may only access the content of the universal database 216 through application programming interface (API) calls to API server 218. For example, through the API server 218, the import and view screen 310 of the end user web application 210 may enable an end user to access, import and view one or more collections stored in universal database 216.

Figure 3A:
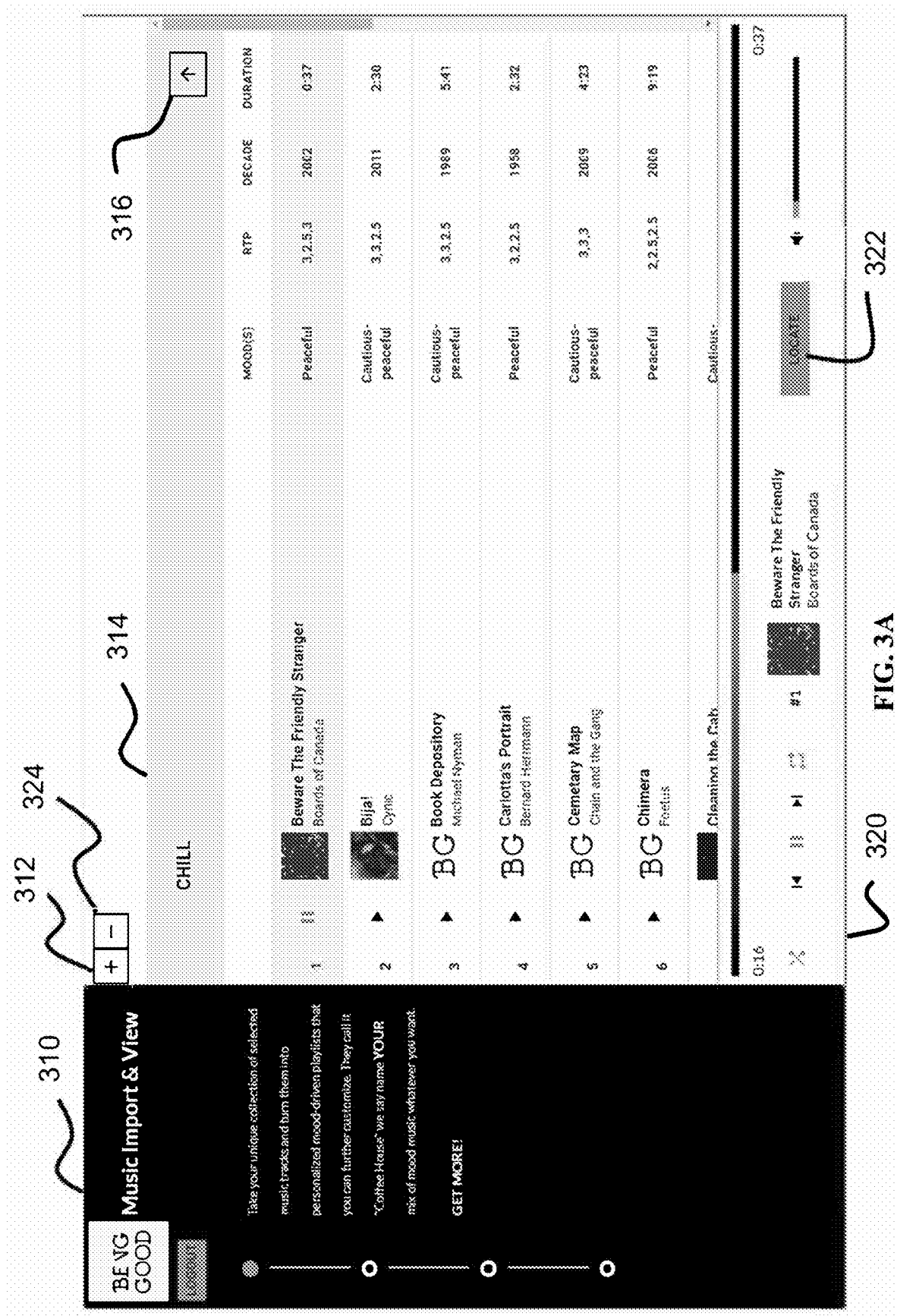
FIG. 3A is an embodiment of an illustration of a music import & view screen of an end user web application.

The end user web application 210 may not import any of the actual digital audio files corresponding to the tracks from the universal database 216, but rather may just import track data, such as the title, artist name, duration, decade of publication, RTP score, the corresponding mood of each track in the collection, and a file hash that will cause the audio files source to stream the tracks to the music import and view screen 310 illustrated in FIG. 3A. Once one or more collections have been received by the end user web application 210, through the music import and view screen 310, the end user may listen to and edit the one or more collections to remove any tracks in the one or more collections that the end user does not want to include in a playlist to be created. An end user may be able to see a list of available collections by selecting the "+" button 312 in the collections menu of FIG. 3A. Once a collection had been imported, the title of the collection and other information about the collections may be displayed in a collection bar 314. As illustrated in FIG. 3A, the title of the imported collection is "CHILL". The "stop" button (not shown in FIG. 3A) in the collection menu may be used to stop the import of a collection. A view controller 316, when the arrow is pointing down, may be selected to open a collection bar 314 to reveal the content of a collection, which is essentially a playlist of tracks within the collection. To close the collection, the arrow may be selected again when the view controller 316 is pointing up. Numerous collections may be imported and stacked in the order imported.

A play button associated with each track in the playlist of an open collection may be selected to play that track in the music player 320. When the track starts playing, the play button in the playlist and in the music player 320 may switch to a pause button. Once a track has been selected to play, when that track has finished playing, the next track in the collection may be played. The music player 320 may also be used to start and pause play of tracks, starting with a selected track, which may be highlighted in some manner. The music player 320 may include other typical music player functions, such as shuffle, fast reverse, fast forward and repeat. The music player 320 may also indicate the number of a track in the playlist of a collection as it is being played. If there are numerous collections with numerous playlists and tracks and the user has been moving between the collections and playlists while playing a track, it may be difficult to find the track that is playing in its associated collection and playlist, so a locate button 322 may be selected to cause the track currently being played to be displayed in an open collection.

To play a track, the API server 218 may communicate with the audio classifier application 208 in order to have the desired track streamed to the end user web application 210 from the audio files source 214. The playlist of imported tracks may be referred to as a "premix" because those tracks represent a mixture of tracks from which an end user may subsequently use to create one or more saved playlists. The premix may be used over and over to create different saved playlists and added to by importing more track data. The premix may also be cleared by using the clear premix button 324 at any time so that a new premix may be created. The premix may also be edited to remove individual tracks. Although not shown in FIG. 3A, a remove button associated with each track may be selected to cause each selected track to be removed when the "−" button in the collection menu is selected.

Figure 3B:
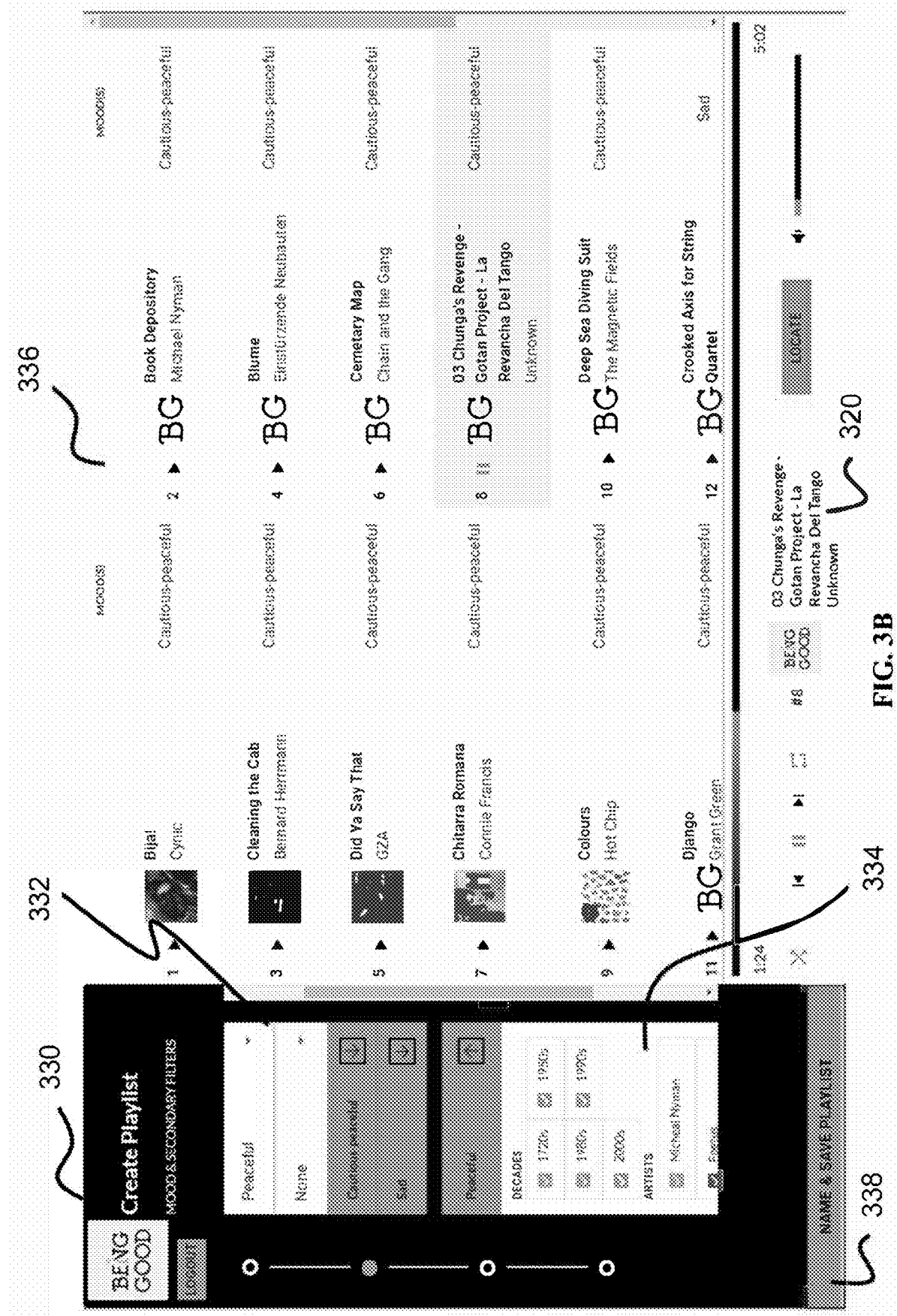
FIG. 3B is an embodiment of an illustration of a create playlist screen of an end user web application.

Once an end user is satisfied with a premix, the create playlist screen 330 of FIG. 3B may be used to create a personalized playlist from the premix. Mood filters 332 may be used to select among different moods corresponding to tracks to be included in a custom playlist. In an embodiment, there may be a total of eight moods, from which a total of four different moods may be selected of use in the mood filters 332, although any number of moods and mood filters may be utilized. In an embodiment, an end user may select only a single mood among the mood filters 332, or all four moods. In an embodiment, the mood selections may correspond to an average singular mood for a track or may correspond to the mood of a portion of a track. For example, multi-mood tracks may have multiple moods that correspond to different portions of the track. For each selected mood, the user may choose to include all tracks that correspond to that mood in a playlist by only using the mood filters, or the user may choose to further filter the playlist by using secondary filters 334. In an embodiment, the second filters 334 may include selections corresponding to decades and artists, but may include additional selections, such as genre and other track metadata that may be available.

In an embodiment, the second filters 334 may be used to include tracks or exclude tracks with certain characteristics. For example, to exclude tracks that were published in the 1960's, the user may select the check box labeled "60s" in the secondary filters 334. To exclude a certain artist, the check box corresponding to that artist may be checked. The filters could also work as inclusion filters where selecting a check box associated with a decade or artist causes only tracks of the selected decade or artist to be included.

The current playlist 336 is initially populated with the premix, less any tracks that were previously removed from the premix. If the premix included 400 tracks, the current playlist 336 may initially include all 400 tracks from the premix. As the mood filters 332 are used, the current playlist 336 may be updated based on the selections. If the mood cautious/excited was selected, and only 30 tracks out of the 400 tracks correspond to the cautious/excited mood, then the current playlist may be reduced to those 30 tracks. If a second mood was selected in the mood filters 332, such as sad, and 100 tracks corresponded to the sad mood, then the current playlist would be updated to include those 100 additional tracks for a total of 130 tracks. The user may then select only certain decades and artists to include in the current playlist 336, which may cause the number of tracks in the current playlist to be further adjusted. Once the filtering has been completed, the user may then listen to the customized playlist using the music player 320. If the user is satisfied with the custom playlist, the playlist may be named and saved by selecting name and save playlist button 338.

Figure 3C:
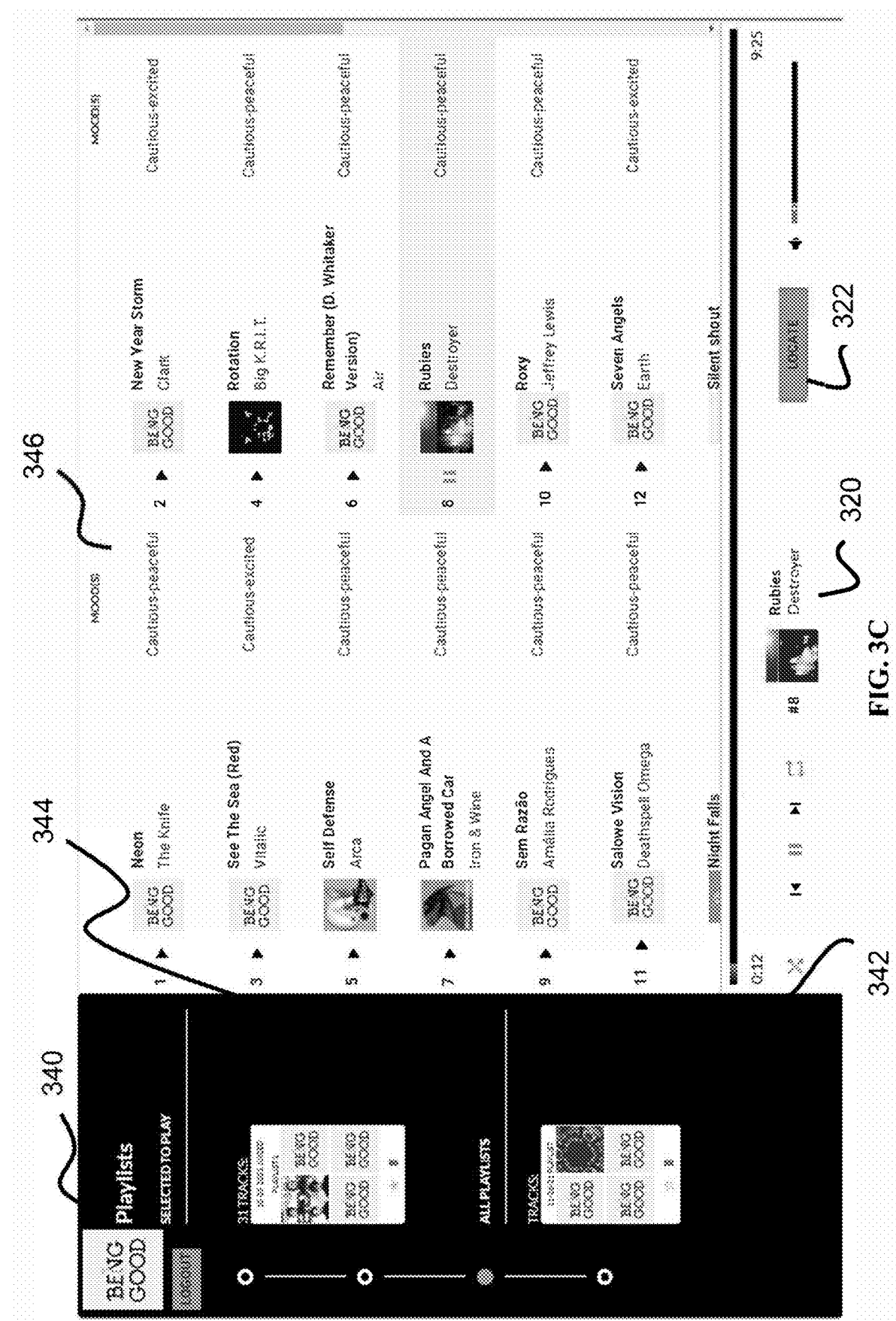
FIG. 3C is an embodiment of an illustration of a playlists screen of an end user web application.

Named and saved playlists may appear in the all playlist section 342 of playlists screen 340, illustrated in FIG. 3C. Initially, all of the playlists that have been named and saved are included in the all playlists section 342. Each playlist includes a listing of the number of tracks included in that playlist, the name of the playlist, the duration of the playlist, which is the cumulative duration of all of the tracks, and an image if one exists. Each playlist may also include an icon in the shape of an outlined star and an icon in the shape of a trashcan. If the star icon is selected by a user, the playlist is moved to the selected to play section 344 and the star icon is filled in. If the star icon is selected again while the playlist is in the selected to play section 344, the playlist is moved back to the all playlist section 342 and the star icon is returned to the outlined star icon. Regardless of whether a playlist is in the all playlist section 342 or the selected to play section 344, if the trashcan icon is selected, a modal window (not shown) is generated asking the user to confirm that the user wants to delete the playlist. If the user confirms, then the playlist is permanently deleted.

When a playlist is added to the selected to play section 344, each of the tracks of that playlist is added to the current playlist 346. Each track of the playlist is consecutively numbered, so it is possible to tell where in the playlist the current track playing is located. As a track is played, the play icon associated with the track transforms to a pause icon. For each additional playlist added to the selected to play section 344, the tracks for that playlist are added to the current playlist 346, concatenated to any prior playlist(s) already in the current playlist 346. At any point in time there is a current playlist 346, the music player 320 may be used to play any of the tracks in the current playlist 346 and the locate button 322 of the music player 320 may be used to locate the track in the current playlist 346 then being played.

Figure 3D:
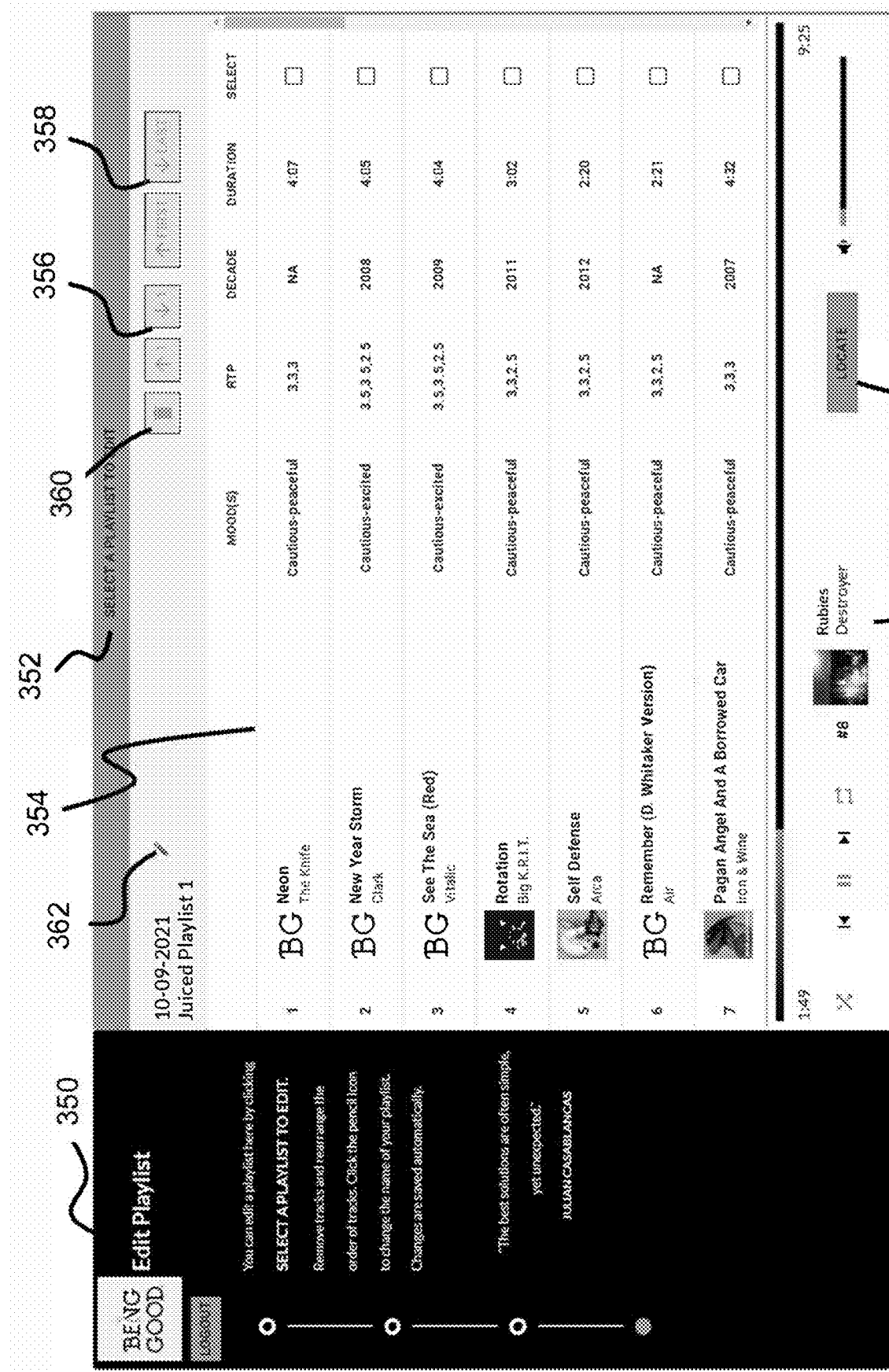
FIG. 3D is an embodiment of an illustration of an edit playlist screen of an end user web application.

Once a playlist has been created, it can then be edited as further illustrated by the edit playlist screen 350 in FIG. 3D. To edit a playlist, the user may select the select a playlist to edit button 352 to see a modal window (not shown) from which a playlist to edit may be selected. The name of that playlist will then be displayed in the playlist name window and the current playlist 354 associated therewith will be displayed. Once the playlist has loaded, different tracks can be selected from the current playlist 354 to be moved or removed. To move a track up or down in the order of the current playlist 354, either of the 1 up or 1 down buttons 356 may be used or either of the up first or down last buttons 358 may be used. Selecting either of the 1 up or 1 down buttons 356 will move the selected track up one track or down one track in the current playlist at a time, while selecting either of the up first or down last buttons 358 will move the selected track to the first track or the last track in the current playlist 354. Tracks may also be removed as desired by checking a remove radio button corresponding to the track for removal and then using remove/update button 360. If the order of the tracks in the current playlist 354 have been moved, selecting the remove/update button 360 will also save those changes. The name of the playlist may also be changed by selecting the change playlist name button 362, which will generate a modal window (not shown) in which the playlist name may be edited and saved. Although tracks could also be added in an embodiment, that is not shown. Individual tracks may be played by playing the play button associated with each track and the current playlist 354 can also be played with the music player 320.

Figure 4:
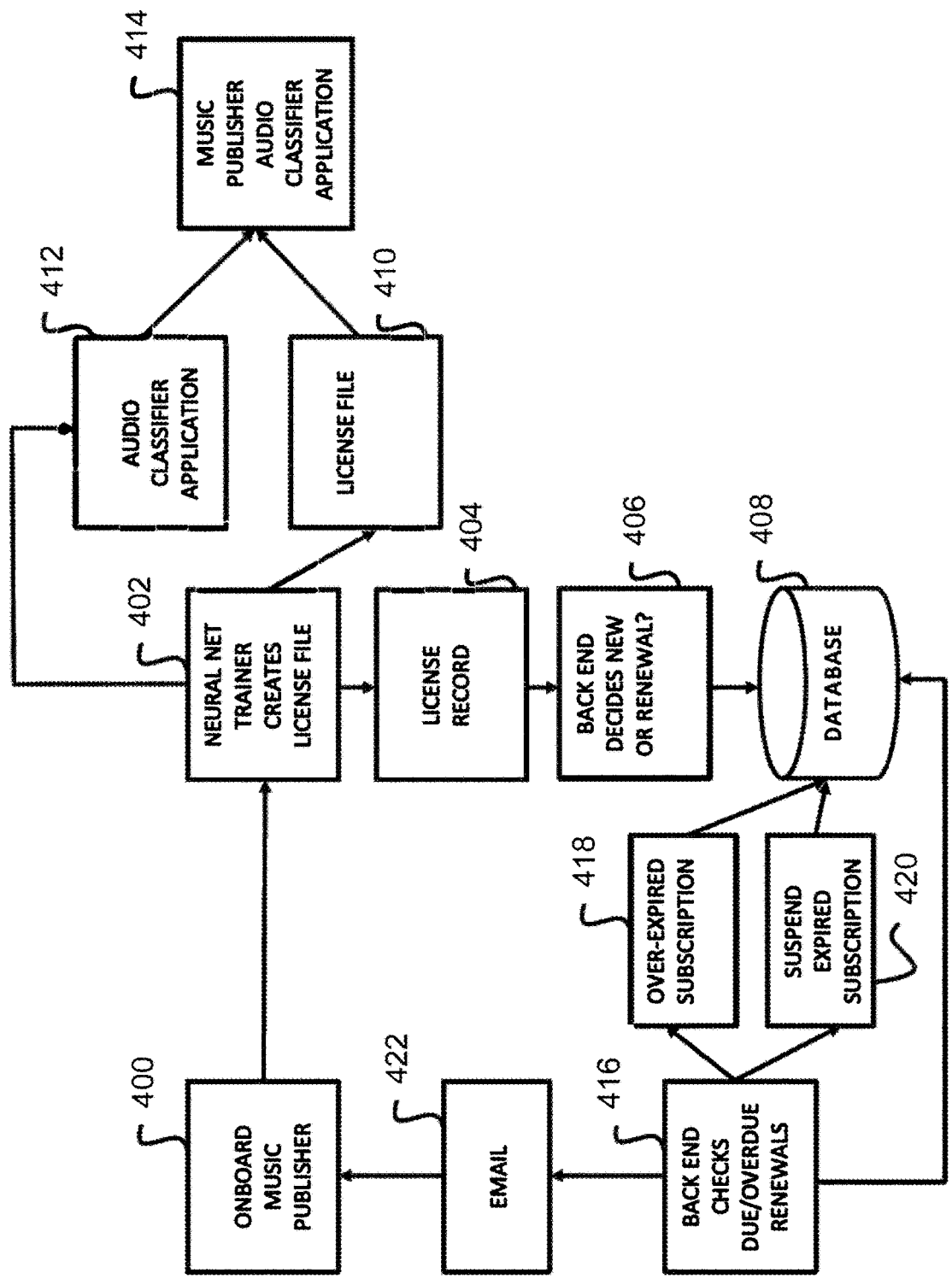
FIG. 4 is an embodiment of an illustration of a process for onboarding a music publisher.

FIG. 4 illustrates a process for onboarding a music publisher. A new or renewing music publisher may be onboarded at step 400 as a result of an agreement with a system operator. This may result in a neural net trainer application 206 of the system operator creating a license file for that music publisher at step 402. A license record may be generated at step 404 and the back end 204 may then decide whether the license record is new or a renewal at step 406 by evaluating a database at step 408. If the music publisher is new, a new license record may be stored in the database and if the music publisher is renewing, the license record for that music publisher may be updated in the database to reflect the new term of the license. At around the same time the license record is created at step 404, a license file may be created at step 410. The audio classifier application 208 may be tasked at step 412 with creating a new audio classifier application that is unique to that music publisher at step 414 using the license file created at step 410.

Once the license file and license record are created, the license needs to be monitored to determine if the license is due for renewal or is overdue for renewal at step 416. If the license is due for renewal, an email will be sent to the music publisher at step 422 to determine if the publisher wants to renew. If the music publisher does renew, the neural net trainer 206 is notified at step 402, the license record is updated at step 404, the back end decides that the license record is a renewal at step 406, and stores the updated license file in the database 408. If the subscription is not renewed on time and is over-expired, the back end would send another email to the music publisher at step 422 and the over-expired subscription would be updated in the database at step 418. If the music publisher does not renew within a period, the expired subscription would be suspended at step 420 and the database would be updated accordingly.

Figure 5:
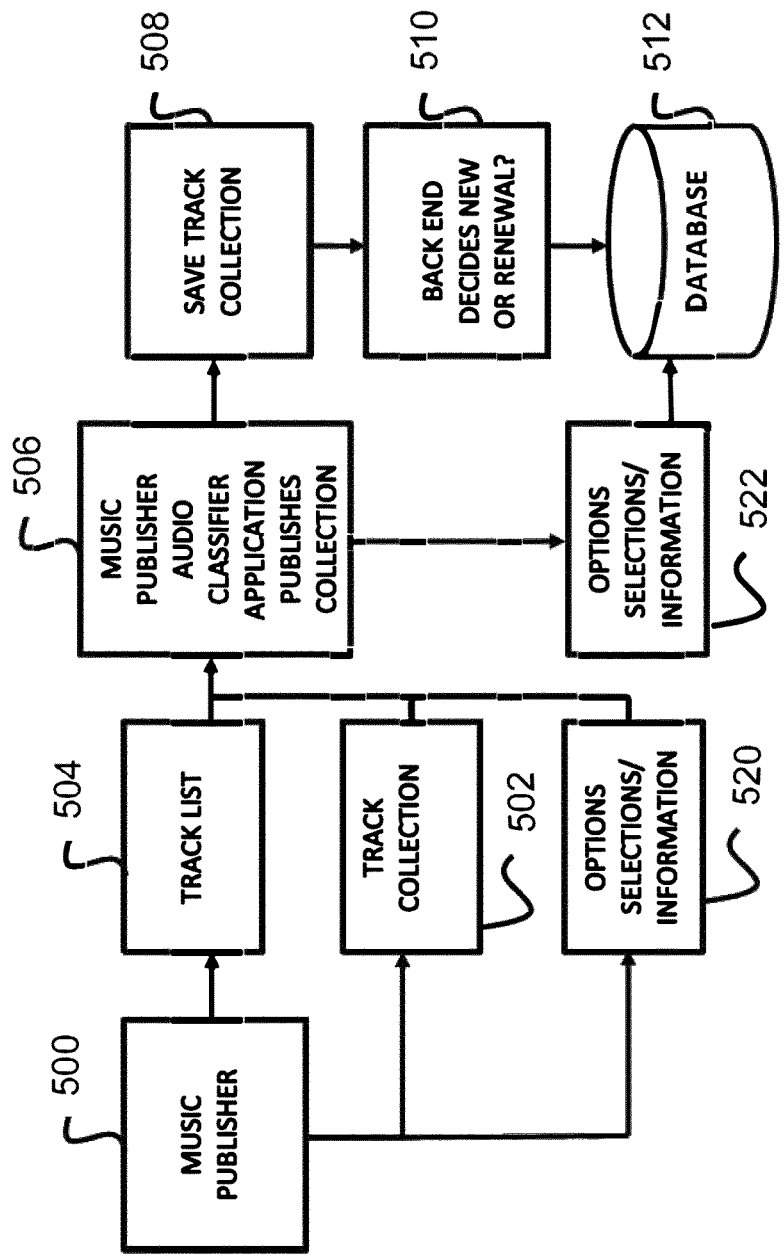
FIG. 5 is an embodiment of an illustration of a process for creating, publishing and exporting track collections and making various option selections and inputting related information.

FIG. 5 illustrates a process for creating, publishing, and exporting track collections and making various option selections and inputting related information. At step 500, the music publisher may initiate the process of creating a track list (i.e., a playlist or a collection of tracks), which may be based on one or more playlists and additional tracks, or a modified version of the same. For example, a collection could be created offline and imported by the music publisher to the audio classifier application 208, at step 502. Alternatively, the music publisher may use existing playlists in the audio classifier application, at step 504, to create a collection, which may be edited to add and/or remove tracks as desired. Once the track list has been created, it can be published at step 506 to make it available to the end user web application 210.

Regardless of whether the collection is published or not, it can be saved, at step 508, along with information about each track in the collection and the collection itself. Track information may include a file name for each track, metadata associated with the track, such as the title and artist, and a unique ID for each track, such as a file hash. Collection information may include a name for the collection, an image to represent the collection, the number of tracks in the collection, the duration of the collection and possibly other information, such as a date associated with when the track is first published and an end date for the collection if the amount of time it will be published is limited, which may be tracked at step 510, where the back end 204 decides if the collection is new and/or a renewal or update of a prior publication of a collection. All of the information associated with the collection may then be stored in the database at step 512.

The music publisher may also make a number of selections for options and input information associated with those options at step 520. For example, the music publisher may want to co-brand the end user web application 210 so that it includes branding information about the music publisher. If this option is selected, the music publisher may upload an image or text to be incorporated into particular areas of the end user web application 210. A URL may also be associated with the image or text so that end users can access a website associated with the music publisher. The music publisher may also desire to select an audio option to insert audio identifiers into a music stream being played by the end user. This would enable, for example, the music publisher to make the streamed music free to end users because commercials, which pay for the streaming service, are also broadcast to end users on a periodic basis, or to enable public radio stations to provide identifiers to end users in order to remind them where the end user web application has come from, or for other purposes. If this option is selected, the music publisher would be able to import audio break tracks, just like other audio tracks, queue the break tracks up, name and rename the breaks, restrict the length of each break or how many can be queued, and specify other details.

Other options that may be selected by the music publisher include a screen saver option and a time out option. The screen saver option would enable some type of message to be displayed on a periodic basis when the end user web application has been playing for a period of time, such as an image or text, that bounces around the screen. The time out option may give the music publisher the ability to stop streaming music to the end user web application after a period of time when the end user is not interacting with the end user web application 210 so as to prevent the music publisher from paying royalties to musicians or record labels if the end user is not actually listening to the streamed music. As all of the different option selections are made and associated information is input, that information is stored in the database by the music publisher at step 522 and published to the end user web application as appropriate.

Figure 6:
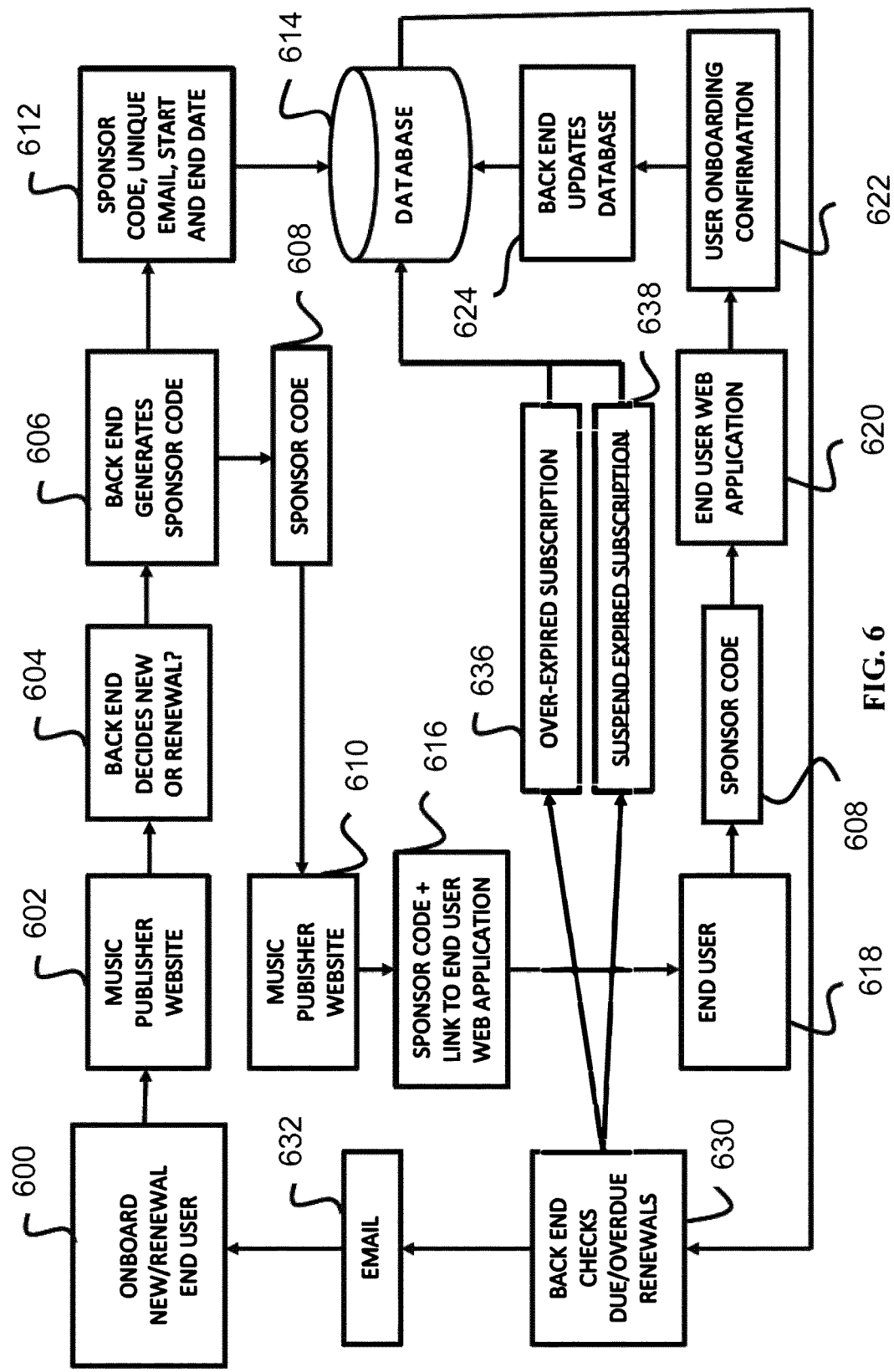
FIG. 6 is an embodiment of an illustration of a process for onboarding an end user and customizing the end user application.

FIG. 6 illustrates a process for onboarding a new end user of the end user web application 210 or renewing an existing end user. A new or renewing end user may be onboarded at step 600 as a result of the end user accessing a music publisher website at step 602. The music publisher website may collect information from the end user, such as a unique email address and password, so that a request, step 604, may be sent from the music publisher website to the back end 204 in order to determine whether the end user is new or a renewal end user. The music publisher may collect other information from the end user, its customer, such as financial information, etc., but only the unique email address is sent to the system operator. If the end user is new, the system operator's back end 204 may generate, at step 606, a sponsor code 608, that may be sent to the music publisher website at step 610. If the end user is just renewing, the sponsor code 608, which already exists, may be sent back to the music publisher website, or a message may be sent to the music publisher website that the end user is a renewal and therefore already has a sponsor code.

The sponsor code, along with a unique email for the new end user, and a start and end date for the sponsor code may be stored, step 612, in database 614. The sponsor code may be a code that the music publisher can provide to an end user that has subscribed to the steaming services to be provided by the music publisher. The music publisher may provide the streaming service for free or for a fee, that is collected by the music publisher through its own systems instead of the back end 204 system operator. Sponsor codes remove the back end system operator from being involved with any financial transaction or exchange between the music publisher and its customers. Sponsor codes also reduce the system operator's involvement in collecting any other information directly from the end user. Under different data privacy rules and regulations around the world, data collectors often have different obligations than do data processors and while this may not absolve the system operator from having to comply with certain data privacy rules and regulations around the world, it simplifies the system operator's obligations. The sponsor code may also be generated in other ways, such as through a standalone application that sends an API request to the back end system 204 providing the same information that might be provided by a music publisher. The sponsor code would then be returned to the standalone application and from there be provided to the end user in a similar manner as the music publisher website.

Once the music publisher website has obtained the sponsor code 608 for a new end user, that sponsor code 608 and the corresponding unique email may be linked to the music publisher's end user web application at step 616 and sent to the database 614. The sponsor code 608 may then be sent to the new end user at step 618. When a new end user accesses the end user web application, the end user will be asked to register. The new end user will need to enter the sponsor code 608 and their unique email and create a password at step 620. The sponsor code 608, email and password will then be sent to the back end 204 to confirm the sponsor code 608 and email matches what is in the database 614 at step 622. When a match is confirmed, the back end 204 updates the database with the password at step 624.

End users that have already registered would only need to enter their unique email and their previously created password in order to be able to use the end user web application 210 assigned to that music publisher. As there may be multiple different music publishers, some end users may attempt to use the same email address with different music publishers. When an existing email address in the database is submitted again with a registration, the end user may be told that that email address is already in use and to use a different email address. In an embodiment, rather than combine all of the end users from different music publishers into one login, each version of end user web application working with a music publisher may be separate. In such a version, the sponsor code may remain displayed once authenticated and identify the sponsor/music publisher so an end user knows which music publisher they are streaming from. That way the end user can use the same email address and potentially the same password for each version of the end user web application.

The back end system may also be responsible for periodically checking for due or overdue renewals at step 630. End user's may periodically be sent an email 632 directly from the back end system if an end user's subscription is approaching renewal or the email may be sent to the music publisher so they may contact the end user instead. If an existing end user has not renewed a subscription and the subscription has over-expired, at step 636, a further attempt may be made to contact the end user in order to get them to renew and the database 614 may be updated with this information. If that effort is not successful, after a period, the subscription may be suspended, at step 638 in the database 614. A suspended subscription may result in the email associated with the subscription being deleted from the database 614.

Figure 7A:
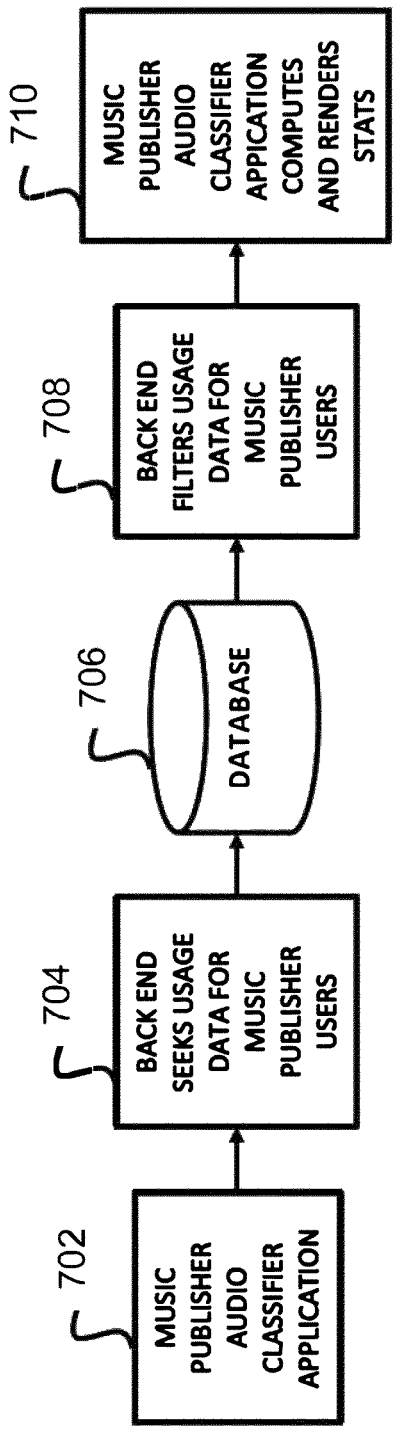
FIG. 7A is an embodiment of an illustration of a process for developing usage statistics at the music publisher level.
Figure 7B:
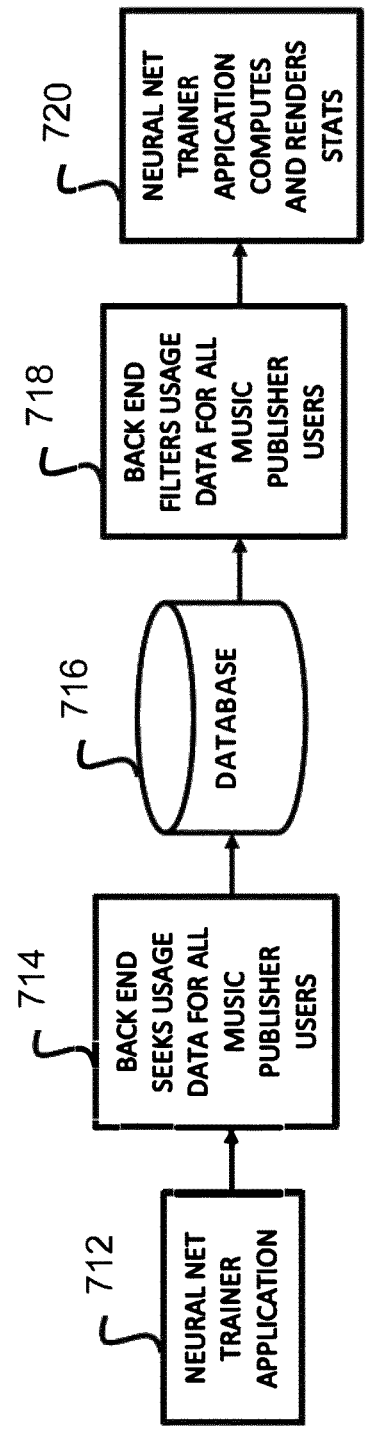
FIG. 7B is an embodiment of an illustration of a process for developing usage statistics at the universal level.

A broad range of statistical data may be generated as a result of usage of the audio classifier application 208, the end user web application 210 and the neural net trainer application 206. FIG. 7A illustrates a process for developing usage statistics at the music publisher level and FIG. 7B illustrates a process for developing usage statistics at a universal level. In addition, other information, some of the data that may be tracked includes the number of unique visitors that have registered with each music publisher, how many users login each day, when they create a playlist, how many playlists they have, which tracks are most popular, and how long they use the app on a daily basis, etc. In order to track royalty payment obligations, every track that is played for more than a minimal period of time during different periods may be tracked, such as per day, month, quarter, etc. As different music publishers may have different contractual obligations or may have different policies on when a track is considered to have been played, the timing of the minimal period may be variable and capable of being set by the music publisher.

Figure 8:
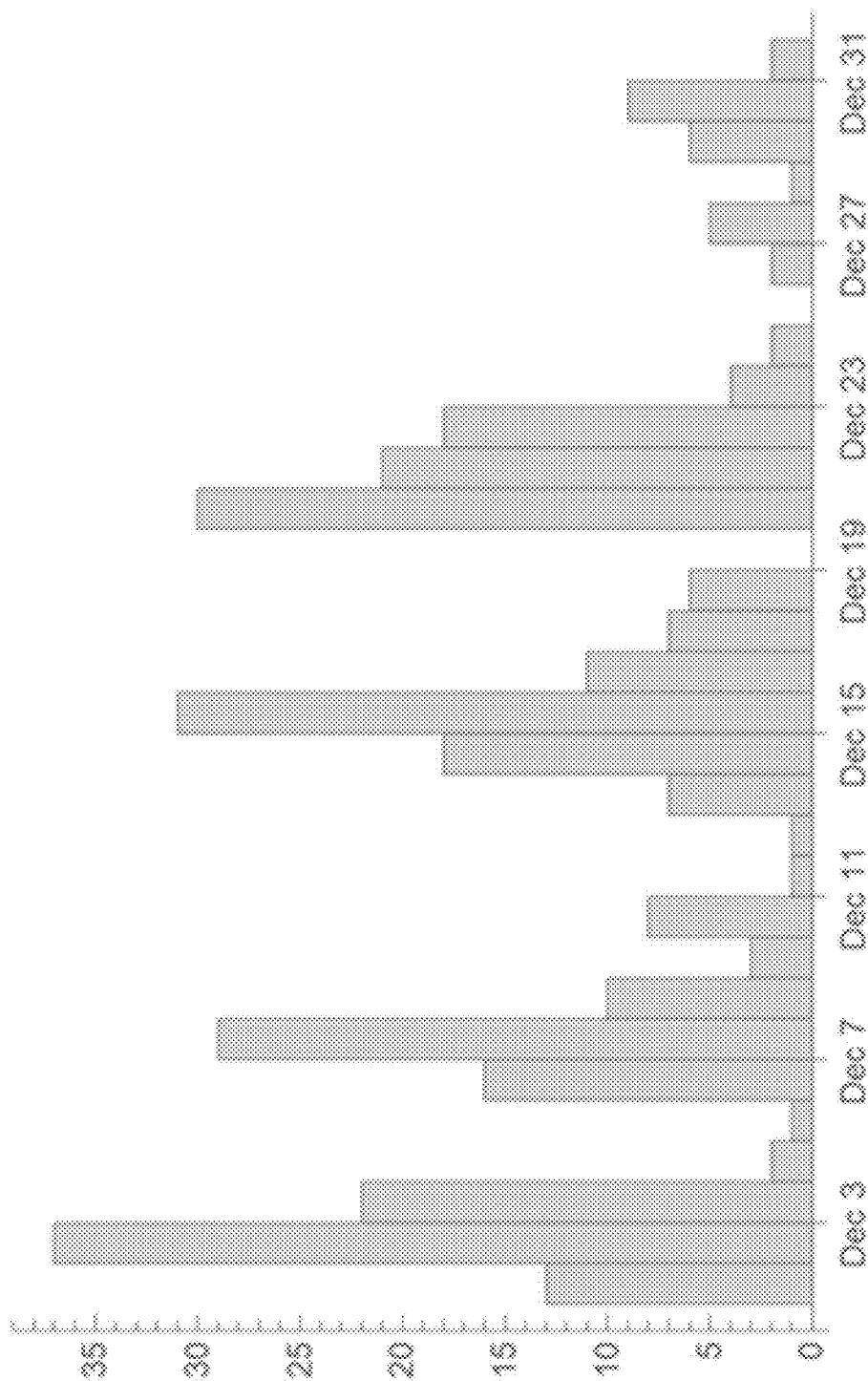
FIG. 8 is a representation of a timeline plot of sponsor codes.

As illustrated in FIG. 7A, this data may be collected and reported at the music publisher level for each of the different music publisher audio classifier applications 208. In such a case, a music publisher audio classifier application 208 may first make a request, at step 702, to the back end, such as through an API call, for certain data. The back end may then seek the corresponding usage data, step 704, from the database at 706. The returned data may then be filtered by the back end, step 708, for example to format the data in a particular way. The data may then be sent to the music publisher audio classifier application for further computation and the rendering of the requested information. A timeline plot of sponsor codes being issued for a current music publisher may appear as depicted in FIG. 8.

In addition to making the data available to the music publisher, the same information may be collected and batched in a report to the universal database 216, for example, on a periodic basis so collective information from every music publisher was available. This data may be aggregate, not personally identifiable information. FIG. 7B illustrates the neural net trainer application 712, making a request of the back end for the usage data of all of the music publishers, step 714, which is pulled from database 716, filtered by the back end at step 718, and computed and rendered by the neural net trainer application, at step 720.

In an embodiment, a method for making categorized music tracks available to an end user application, comprising: at one or more first applications, extracting low-level data from each track among a plurality of tracks to be RTP scored, wherein an RTP score includes a rhythm score (R), a texture score (T), and a pitch score (P) respectively from a R range, a T range, and a P range, each RTP score corresponding to a category among a plurality of categories; at the one or more first applications, analyzing the low-level data to develop a plurality of high-level acoustic attributes for each track among the plurality of tracks; at the one or more first applications, analyzing the high-level acoustic attributes to develop computer-derived RTP scores for each track among the plurality of tracks; at the one or more first applications, utilizing the computer-derived RTP scores for each track to determine a corresponding category for each track among the plurality of categories; at the one or more first applications, creating one or more collections of tracks from among the plurality of tracks based on tracks corresponding to one or more categories among the plurality of categories; at the one or more first applications, publishing the one or more collections on a network accessible to an end user application configured to create one or more playlists based on the one or more collections; and making one or more of the tracks in the one or more playlists available to the end user application.

The embodiment further comprising: at the one or more first applications, storing the computer-derived RTP score for each track in a universal database accessible to each of the one or more first applications; and at the one or more first applications, prior to extracting the low-level data from a track among the plurality of tracks, checking the universal database to determine if the computer-derived RTP score for the track has already been stored in which case the extracting low-level data, the analyzing the low-level data, and the analyzing the high-level acoustic attributes for the track are bypassed.

In the embodiment, wherein the one or more collections are published to the end user application through an intermediate API server in communication with the universal database.

The embodiment, further comprising: at the one or more first applications, uploading one or more of the tracks among the plurality of tracks having computer-derived RTP scores to a streaming server; and wherein the making one or more of the tracks in the one or more playlist available to the end user application includes streaming from the streaming server the one or more tracks in the one or more playlists to the end user application.

In the embodiment, wherein the one or more collections are published to the end user application through an intermediate API server.

In the embodiment, wherein a training application provides one or more of low-level training data and high-level acoustic attributes training data to the one or more first applications.

In the embodiment, wherein the training application authorizes the one or more first applications to publish the one or more collections.

In the embodiment, wherein each of the one or more first applications authorize the one or more end user applications to access the one or more published collections.

The embodiment further comprising: at a first application among the one or more first applications, causing a sponsor code to be generated for the end user application and sent to a website affiliated with an operator of the first application; at the website, sending the sponsor code to an end user; and at the end user application, receiving the sponsor code to authorize the end user application's access to the one or more published collections.

In an embodiment, a system for making categorized music tracks available to an end user application, comprising: one or more first applications configured to: extract low-level data from each track among a plurality of tracks to be RTP scored, wherein an RTP score includes a rhythm score (R), a texture score (T), and a pitch score (P) respectively from a R range, a T range, and a P range, each RTP score corresponding to a category among a plurality of categories; analyze the low-level data to develop a plurality of high-level acoustic attributes for each track among the plurality of tracks; analyze the high-level acoustic attributes to develop computer-derived RTP scores for each track among the plurality of tracks; utilize the computer-derived RTP scores for each track to determine a corresponding category for each track among the plurality of categories; create one or more collections of tracks from among the plurality of tracks based on tracks corresponding to one or more categories among the plurality of categories; and publish the one or more collections to a network; one or more end user applications configured to create one or more playlists based on the published one or more collections; and a streaming server configured to communicate with the one or more first applications, to communicate and the one or more end user applications, and to make one or more of the tracks in the one or more playlists available to the one or more end user applications.

The embodiment further comprising a universal database accessible to each of the one or more first applications, wherein the one or more first applications are further configured to: store the computer-derived RTP score for each track in the universal database; and prior to extracting the low-level data from a track among the plurality of tracks, check the universal database to determine if the computer-derived RTP score for the track has already been stored in which case the one or more first applications bypass extracting low-level data, analyzing the low-level data, and analyzing the high-level acoustic attributes for the track.

The embodiment further comprising an intermediate API server and wherein the one or more collections are published to the end user application through the intermediate API server in communication with the universal database.

In the embodiment, wherein the one or more first applications are further configured to upload one or more of the tracks among the plurality of tracks having computer-derived RTP scores to the streaming server; and wherein the streaming server makes one or more of the tracks in the one or more playlist available to the one or more end user applications by streaming from the streaming server the one or more tracks in the one or more playlists to the one or more end user applications.

The embodiment further comprising an intermedia API server and wherein the one or more collections are published to the end user application through the intermediate API server.

The embodiment further comprising a training application configured to provide one or more of low-level training data and high-level acoustic attributes training data to the one or more first applications.

In the embodiment wherein the training application is configured to authorize the one or more first applications to publish the one or more collections.

In the embodiment wherein each of the one or more first applications is configured to authorize the one or more end user applications to access the one or more published collections.

In the embodiment wherein a first application among the one or more first applications is configured to cause a sponsor code to be generated for the end user application and to send the sponsor code to a website affiliated with an operator of the first application; wherein the website is configured to send the sponsor code to an end user; and wherein the end user application is configured to receive the sponsor code in order to authorize the end user application's access to the one or more published collections.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. The example systems and components described herein may be configured differently than described. For example, elements may be added to, removed from, or rearranged compared to the disclosed examples.

While certain example or illustrative examples have been described, these examples have been presented by way of example only and are not intended to limit the scope of the subject matter disclosed herein. Indeed, the novel methods and systems described herein may be embodied in a variety of other forms. The accompanying claims and their equivalents are intended to cover such forms or modifications as would fall within the scope and spirit of certain of the subject matter disclosed herein.

What is claimed:

1. A method for selecting a song, comprising:
    selecting the song based on a computer-derived comparison between a representation of the song to known similarities in representations of other songs, wherein the known similarities in representations of other songs is based at least in part on a human-trained machine using the representations of the other songs, wherein the representation of the song is based on isolating and identifying frequency characteristics of the song, wherein the representations of a plurality of the other songs are based on a human listening to each of the plurality of the other songs in order to isolate and identify frequency characteristics of the plurality of the other songs, wherein the frequency characteristics of the song correspond to one or more moods of the song and the frequency characteristics of the plurality of the other songs correspond to one or more moods of the plurality of the other songs, and wherein the selection is based on the similarity between the one or more moods of the song and the one or more moods of the plurality of the other songs.

2. The method of claim 1, wherein the representation is an audio fingerprint.

3. The method of claim 2, wherein the audio fingerprint is based on a spectrogram of the song.

4. The method of claim 3, wherein the audio fingerprint includes a plurality of sub-images.

5. The method of claim 4, wherein the plurality of sub-images represent frequency of the song over time.

6. The method of claim 1, further comprising sampling the representation.

7. The method of claim 1, wherein the representation is based on frequency data, further comprising analyzing the frequency data to capture intensity differences represented by the frequency data.

8. The method of claim 7, further comprising filtering the frequency data to create a digitized representation based on the frequency data.

9. The method of claim 1, wherein the representation is a static visual representation of the song.

10. The method of claim 9 wherein the static visual representation is a spectrogram.

11. The method of claim 1, further comprising checking the one or more moods of the song against at least one other mood identification technique for a level of correlation between the one or more moods of the song and the one or more moods of the plurality of the other songs.

12. The method of claim 1, wherein the frequency characteristics of the song and the frequency characteristics of the other songs are based on a melody, a rhythm and a harmony of the song and the plurality of the other songs.

13. The method of claim 1, wherein the one or more moods represent multiple moods in the song and the plurality of the other songs.

14. The method of claim 13, wherein the multiple moods of the song are represented by percentages of the one or more moods.

15. The system of claim 1, further comprising checking the one or more attributes of the song and the one or more attributes of the other songs against at least one other mood identification technique for a level of correlation between the one or more attributes of the song and the one or more attributes of the other songs.

16. A system for selecting a song, comprising:
sample frequency data from the song;
generate a representation of the sampled frequency data;
filter the representation of the sampled frequency data to capture intensity differences represented in the representation to generate a digitized representation that corresponds to one or more attributes of the song;
compare the digitized representation to known similarities in digitized representations of a plurality of other songs having one or more attributes of the plurality of the other songs, wherein the known similarities in the digitized representations of the plurality of the other songs are based at least in part on a human-trained machine based on a human listening to each of the plurality of the other songs in order to isolate and identify frequency characteristics of the each of the plurality of the other songs, wherein the digitized representation is based on frequency characteristics of the song, wherein the digitized representations of the plurality of the other songs is based on the frequency characteristic of the each of the plurality of the other songs, wherein the frequency characteristics of the song and the frequency characteristics of the each of the plurality of the other songs correspond to the one or more similar moods of the song and the each of the plurality of the other songs; and
select the song based on the one or more similar moods.

17. The system of claim 16, wherein the digitized representation and the digitized representations are static visual representations of the song and the each of the plurality the other songs.

18. The method of claim 16, wherein the one or more attributes of the song and the one or more attributes of the other songs are based on a melody, a rhythm and a harmony of the song and the other songs.

19. The method of claim 16, wherein the one or more moods of the song represent multiple moods in the song.

20. The method of claim 19, wherein the multiple moods of the song are represented by percentages of the one or more moods.

* * * * *